Oct. 12, 1948.
L. O. THUNBERG
2,451,452
FEED CLAW AND SHUTTER MOVEMENT FOR
MOTION PICTURE MECHANISMS
Filed Nov. 20, 1946
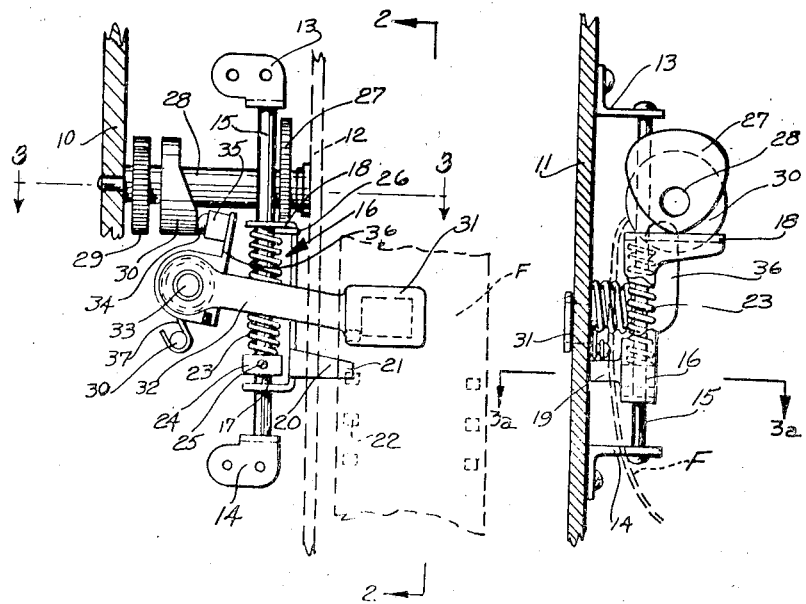
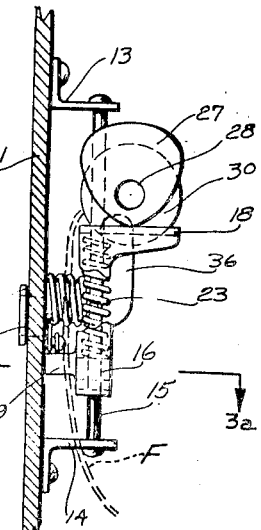
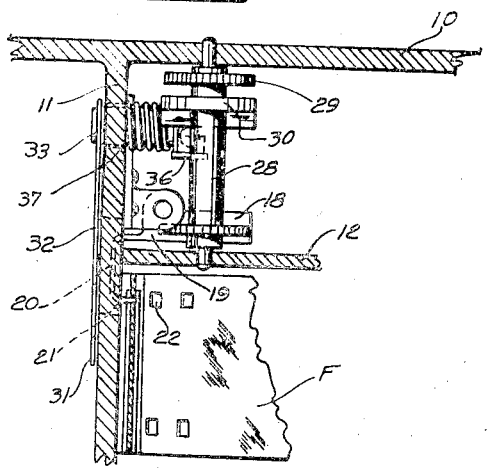
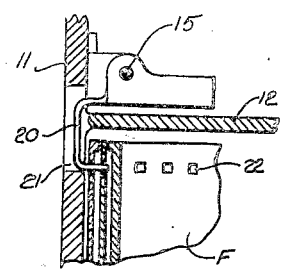
INVENTOR.
LEANDER O. THUNBERG
BY
Rodney C. Southworth
ATTORNEYS Patented Oct. 12, 1948

2,451,452

UNITED STATES PATENT OFFICE 2,451,452

FEED CLAW AND SHUTTER MOVEMENT FOR MOTION-PICTURE MECHANISMS

Leander Olov Thunberg, Johnson City, N. Y., assignor to General Aniline & Film Corporation, New York, N. Y., a corporation of Delaware Application November 20, 1946, Serial No. 711,052

4 Claims. (Cl. 88—18.4)

This application pertains to an invention in feed claw and shutter movements for motion picture apparatus, such as motion picture cameras and projectors.

Among the objects of the invention is that of devising a simple and effective feed claw and shutter blade actuating means of such type that a more or less unitary driving element is employed to impart movement to those parts.

Another object of the invention is that of devising a mechanism of the type described which shall function to impart definite, cam controlled movements to a film feeding claw and to a shutter and shall impart such motion to these elements in definite synchronization.

Another object of the invention is that of devising a mechanism of the type described in which noise shall be kept at a minimum and wherein there shall be no lost motion after an extended period of wear.

It is another object of the invention to devise a simple, effective feed claw motion in which a single spring serves to return the claw to one extreme position and also to maintain that claw in engagement with the perforated edge of the film.

Other objects of the invention will become apparent as the disclosure progresses and by reference to the accompanying figures of drawing wherein like reference numerals represent like parts in the several views. A detailed description of one embodiment which the invention may take will be given. In the figures of drawing:

Fig. 1 is an elevation of as much of the mechanism and attendant parts of a moving picture camera as is necessary for an understanding of the invention.

Fig. 2 is a section taken at line 2—2, Fig. 1.

Fig. 3 is a section taken at line 3—3, Fig. 1.

Fig. 3a is partial section taken at line 3a—3a, Fig. 2.

Referring to the figures, the side wall 10 and a transverse wall 11, parts of a typical moving picture camera, are shown in Figs. 2 and 3, but wall 11 is omitted in Fig. 1 since its presence there would only serve to confuse. An intermediate wall 12 is indicated in dotted lines in Fig. 1 and in full lines in Figs. 3 and 3a, and it is to be understood that the space between walls 10 and 12 is that occupied by the spring motor or other power means for the camera, while that space at the other side of wall 12 is occupied by the film, supports therefor, cores on which it wound and from which it is withdrawn, sprockets, and other conventional elements incidental to feeding and taking up the film as it is exposed.

On the wall 11 there are provided two brackets 13 and 14 between the angularly projecting parts of which is supported a guide post 15. That guide post 15 serves as a bearing for a shuttle generally indicated by numeral 16 and having the angularly bent parts 17 and 18 which are drilled to form a bearing on the post 15. The part 18 also serves as a cam engaging follower for the shuttle. The shuttle 16 also has projecting forwardly in the direction of wall 12 and then at right angles thereto as at 19 and 20, an arm which terminates in a claw 21. This claw is sometimes referred to as a pull-down. The claw 21 aligns with a row of perforations 22 at one side of the film F. The film herein shown and the type of camera to which the invention is applied merely by way of illustration is an 8 mm. type camera, for a so-called double-8 mm. type film. It is to be understood that the invention is by no means limited to any particular size of film or any partictular type of camera or projector.

A spring 23 is under compression or is otherwise longitudinally loaded between the angularly bent bearing extension 18 for the shuttle and an adjustable collar 24 locked by means of a set screw or other locking means 25 to the post 15. The lower end of spring 23 passes downwardly into a drilled hole in the collar so that the spring may not turn once the collar has been tightly adjusted on the post except by torsionally deflecting it. The upper end of the spring projects laterally as at 26 to engage a part of the shuttle, and the collar 24 is so adjusted that the spring, in addition to being under a predetermined amount of compression, is also so disposed as to urge the shuttle and the claw carried thereby in a direction such that the claw will always tend to engage against the surface of film F and to enter the perforations 22 when in alignment therewith.

By rotating the collar 24, the spring 23 may be adjusted to exert more or less pressure upon the claw and, therefore, cause it to engage the perforations with that degree of certainty necessary, but avoiding excessive pressure such as might injure the film upon the return stroke at which time the claw slips from one perforation to slide upwardly along the surface of the film until it snaps into the next following perforation. The compression in the spring may be adjusted by raising or lowering the collar so that without undue pressure against the cam, the engagement between it and cam 27 will be assured. The film engaging end of the claw is beveled in the conventional manner as in Patents 2,211,334 or 2,095,850, thereby to permit it to be withdrawn from the film perforations upon upward movement of shuttle 16.

Cam 27 is fixed for rotation with a shaft 28 pivoted at either end in suitable bearings and driven by a motor and certain intermediate gearing (not shown) meshing with a gear 29 fixedly attached to the shaft. The shaft also has fixed for rotation therewith a second cam 30 which imparts the necessary movement to the shutter.

Cam 27, as shown more clearly in Fig. 2, is so designed as to impart the required movement to the claw so as to move the film quickly, but without undue strain, and to permit as long a period of rest between the advancing of one frame and that of the next as is practicable.

A shutter comprising a blade 31 at the end of an arm 32 fixed on a shaft at 33 is movable by the face cam 30 as that cam engages a roller or ball type follower 34 set in a holder 35 at the end of a lever or arm 36 which is also attached to shaft 33 and connected for simultaneous movement with the arm 32 which carries the shutter blade itself. The blade 31 covers the exposure aperture (not shown). The pivot shaft 33 for the shutter blade and lever 36 passes through the wall 11 in which there is a bushing or other suitable bearing upon which the parts are free to be moved. A spring 37 is coiled about the shaft 33 and is fixed at one end to lever 36 and at the other end to a pin 38 projecting from wall 11. This spring 37 tends to move the shutter blade upwardly and to maintain the follower 34 in contact with the cam surface of the cam 30. The follower 35 is a hardened steel ball set for free rotation in the socket or holder 35 and, therefore, develops a minimum of friction against the said cam.

The cam face itself is so designed that the shutter is opened rapidly and is likewise closed very rapidly and remains in open position for the intended duration while the film F is mantained absolutely stationary. Since the cams 27 and 30 are mounted on the same shaft 28, it is possible to design the effective contours thereof to give the very best timing of the parts and also to impart the most desirable movement to both the claw and to the shutter blade. The different functions controlled may be designed and set so that one follows another or precedes another by an extremely small interval of time. The various functions always recur in the exact predetermined time for which the mechanism is designed and cannot get out of synchronism as may possibly happen in other mechanisms in which the parts are not so corelated.

Since the follower 34 is always maintained in contact with its cam as is the upper surface of shuttle 16 with the cam 27, the parts function with no appreciable noise and that condition prevails even after a very extended period of wear.

While one embodiment of the invention has been disclosed, it is to be understood that the inventive concept may be carried out in a number of ways. This application is, therefore, not to be limited to the precise details described, but is intended to cover all variations and modifications thereof falling within the spirit of the invention and the scope of the claims.

I claim:

1. A combined feed claw and shutter mechanism for motion picture apparatus which includes a guide means, a member slidable on said guide means, said member having as a part thereof a film engaging claw, a pivoted shaft and a shutter blade fixed thereon, a shaft adapted to be driven by a source of motive power and having rotatable therewith two cams, one said cam engaging with the slidable member for moving it and the claw for advancing the film from frame to frame during exposure, a spring fixed against rotation at one end and being connected at its other end to the slidable member, said spring being under torsion to press the claw against the film for engaging perforations therein, and further being longitudinally loaded to maintain the member in engagement with its actuating cam, an operating lever fixed to said pivoted shaft for movement with said shutter and having a follower engaging the cam surface of the other of said cams, and resilient means for maintaining said follower in engagement with the said other cam.

2. A combined feed claw and shutter mechanism for motion picture apparatus which includes a guide post, a shuttle slidable on said guide post and carrying a film engaging claw, a pivoted shaft and a shutter blade fixed thereon, a driven shaft having fixed for rotation therewith two cams, one said cam engaging with the shuttle for moving it and the claw for advancing the film from frame to frame during exposure, a spring fixed against rotation at one end and being connected at its other end to the shuttle and biased to press the claw against the film for engaging perforations therein, said spring further being longitudinally loaded to maintain the shuttle in engagement with its actuating cam, an operating lever fixed to said pivoted shaft for movement with said shutter and having a follower engaging the other of said cams, and resilient means for maintaining said follower in engagement with that cam.

3. A combined feed claw and shutter mechanism for motion picture apparatus which includes a guide post, a shuttle slidable on said guide post and carrying a film engaging claw, a pivoted shaft and a shutter blade fixed thereon, a driven shaft having fixed for rotation therewith two cams, one said cam engaging with the shuttle for moving it and the claw for advancing the film from frame to frame during exposure, a spring fixed against rotation at one end by attachment to a collar on said post, and being connected at its other end to the shuttle, said spring being under compression between said collar and a part of said shuttle to urge it in one direction and further being under torsion for turning the shuttle about the post thereby to press the claw against the film to engage the perforations therein, an operating lever movable with said pivoted shutter and having a follower at its free end for engagement with the second of said cams on said shaft, and a spring under tension and so disposed as to maintan the said follower in engagement with the surface of said cam.

4. A combined feed claw and shutter mechanism for motion picture apparatus which includes a guide post, a shuttle slidable on said guide post and carrying a film engaging claw, a pivoted shaft and an arm having one end attached to said pivoted shaft and having at its other end a shutter blade, a driven shaft having fixed for rotation therewith two cams, one of said cams being adapted to impart the necessary movements for actuating said claw and being engaged with a surface of said shuttle for moving the shuttle and its claw to advance the film from frame to frame during exposure, a spring coiled about said post and having one end fixed to an adjustable collar on said post and its other end engageable with the said shuttle, said spring being under compression for maintaining the shuttle in engagement with the said cam and also under torsion for urging the shuttle in one direction about the post for pressing the claw into engagement with the film thereby to engage perforations in the film, a lever extending from the pivoted shaft on which the shutter blade and its arm are fixed, said lever carrying a follower for engagement with the cam surface on the second of said cams carried by said shaft, and a spring for urging said lever, arm and shutter blade in one direction about said pivot and for maintaining the follower in engagement with the cam surface.

LEANDER OLOV THUNBERG.

REFERENCES CITED

The following references are of record in the file of this patent:

UNITED STATES PATENTS

| Number | Name | Date |
| --- | --- | --- |
| 1,437,152 | Roop | Nov. 28, 1922 |
| 1,868,331 | Merle | July 19, 1932 |

FOREIGN PATENTS

| Number | Country | Date |
| --- | --- | --- |
| 244,081 | Great Britain | May 13, 1926 |
| 451,395 | Germany | Oct. 26, 1927 |